United States Patent [19]
McCorkle et al.

[11] Patent Number: 5,671,603
[45] Date of Patent: Sep. 30, 1997

[54] APPARATUS FOR CONTROLLING LEVEL OF CRYOGENIC LIQUID

[75] Inventors: E. Joel McCorkle, Woodbury; Herman Vogel, Newtown, both of Conn.; Marcel Margulies, Scarsdale, N.Y.; Richard T. Ferranti, Huntington, Conn.

[73] Assignee: The Perkin-Elmer Corporation, Norwalk, Conn.

[21] Appl. No.: 569,436

[22] Filed: Dec. 8, 1995

[51] Int. Cl.⁶ .................................................. F17C 13/02
[52] U.S. Cl. ..................... 62/49.2; 73/295; 137/392
[58] Field of Search ...................... 62/49.2; 137/392; 73/295

[56] References Cited

U.S. PATENT DOCUMENTS 4,135,548  1/1979  Sears ........................................... 62/49.2
4,744,222  5/1988  Murai ........................................... 62/49.2
5,293,750  3/1994  Tamura et al. ............................... 62/49.1

*Primary Examiner*—Ronald C. Capossela
*Attorney, Agent, or Firm*—Edwin T. Grimes; Herbert S. Ingham; David Aker

[57] ABSTRACT

An apparatus for controlling level of cryogenic liquid in a vessel includes a transfer duct to a pressure supply tank. Pressure pulses are applied to the tank at one rate when the level is below a primary sensor in the vessel, and at a lower rate when the level is above the sensor, so as to compensate for intrinsic declination of the level. At startup a constant pressure is applied to the tank until the level reaches a lower sensor, and a relief valve over the tank is opened when the level overshoots to an upper sensor. Turbulence in the vessel is reduced by a pair of coaxial baffles at the liquid inlet to the vessel, and by a housing with tubular extensions enveloping the sensors.

18 Claims, 5 Drawing Sheets

APPARATUS FOR CONTROLLING LEVEL OF CRYOGENIC LIQUID

BACKGROUND

A number of devices and instruments utilize liquid nitrogen or other liquified gas in a reservoir. In some cases, such as precision differential scanning calorimeters which cool samples through thermal communication with the cryogenic liquid, it is necessary to maintain an accurate level of the liquid in order to keep the sample accurately at temperature. Conventional methods, for example with floats connected to valves, do not necessarily maintain the level with sufficient precision.

Therefore, an object of the invention is to provide a novel apparatus for maintaining a level of cryogenic liquid in a vessel with a high degree of precision. Another object is to provide such an apparatus with automated startup procedures for initially filling the vessel to the level to be maintained in a reasonable time.

SUMMARY

The foregoing and other objects are achieved, at least in part, by an apparatus for controlling level of cryogenic liquid, comprising a vessel for containing a cryogenic liquid having a liquid level in the vessel subject to an intrinsic declination, a pressure tank for holding a supply of the cryogenic liquid, a transfer duct connected to transfer liquid from the tank to the vessel by pressure in the tank, pressure means for selectively effecting pressure in the tank so as to effect the transfer, a primary sensor disposed to sense the liquid level being above or below a selected operating level, and a controller operatively connected between the primary sensor and the pressure means for commanding the pressure means to effect control pressure to the tank. The control pressure comprises a first series of pressure pulses effected when the liquid level is below the operating level such that the pressure in the tank is augmented until the liquid level reaches the operating level. Preferably the control pressure further comprises a second series of pressure pulses effected when the liquid level is above the operating level such that the pressure in the tank is decremented until the liquid level reaches the operating level, the first series and the second series of pressure pulses being applied alternately as pressure pulse cycling. The liquid level thereby is maintained substantially at the operating level in compensation for the intrinsic declination.

In a preferred embodiment, the apparatus further comprises a lower sensor disposed in the vessel at a lower level than the operating level for sensing the liquid level being above or below the lower level. The control pressure further comprises a startup sequence prior to the pressure pulse cycling, comprising a constant initial pressure to the tank when the liquid level is below the lower level, so as to transfer liquid to the vessel more rapidly during startup than with the pressure pulses.

In a further embodiment, the apparatus comprises an upper sensor disposed in the vessel at a higher level than the operating level for sensing the liquid level being above the higher level. The startup sequence further comprises termination of application of control pressure and simultaneously opening of a pressure relief valve on the tank for a time delay commencing during application of the initial pressure when the initial pressure the liquid level reaches the lower level. The time delay is selected such that the liquid level normally reaches a preliminary level proximate the operating level, and the startup sequence further comprises initiating the pressure pulse cycling after the time delay.

In a further aspect the apparatus comprises a sensor assembly mounted into the vessel, the assembly comprising each sensor, a housing including a base section, and a circuit board affixed in the base section. Each sensor comprises an electronic temperature sensor with support leads connected into the circuit board so that the sensor extends downward from the base section into the vessel to its respective level. The housing further includes a tubular extension for each sensor extending downward in the vessel. Each extension openly envelopes its sensor and support leads and extends to a point incrementally below its sensor. Each extension has a bottom opening and a vent hole above a nominally maximum liquid level. The liquid level can thereby extend into each tubular extension with a minimum of physical and thermal turbulence.

Objects are also achieved by an apparatus for transferring cryogenic liquid, comprising a vessel for containing a cryogenic liquid, a pressure tank for holding a supply of the cryogenic liquid and having a sealed cover, and a transfer duct connected to transfer liquid from the tank to the vessel by pressure in the tank. The transfer duct comprises a transfer line connected to transfer liquid from the tank, a vessel inlet section sealed into the cover, and a duct section connected between the transfer line and the inlet section. The duct section comprises a duct housing with an exhaust channel therein, and a liquid injection tube extending therethrough. The injection tube is connected to pass liquid from the transfer line, and the housing duct has an exhaust port proximate the transfer line and, oppositely from the port, an opening into the inlet section. The inlet section comprises a cylindrical outer baffle extending downward from the ducting section into the vessel substantially below the operating level, a cylindrical inner baffle mounted coaxially within the outer baffle so as to define an annular space therebetween, and an injection end of the injection tube extending partially into the inner baffle. The injection tube has an exit end below a nominally minimum operating level. The outer baffle has one or more exhaust vents located in the vessel above a nominally maximum liquid level so as to exhaust gas from above the liquid level in the vessel through the duct housing to the exhaust port. The inner baffle has an upper end located below the exhaust vents and a lower end located above that of the outer baffle Liquid under pressure from the tank thereby is injected under pressure from the tank into the vessel with a minimum of physical and thermal turbulence.

DETAILED DESCRIPTION

Figure 1:
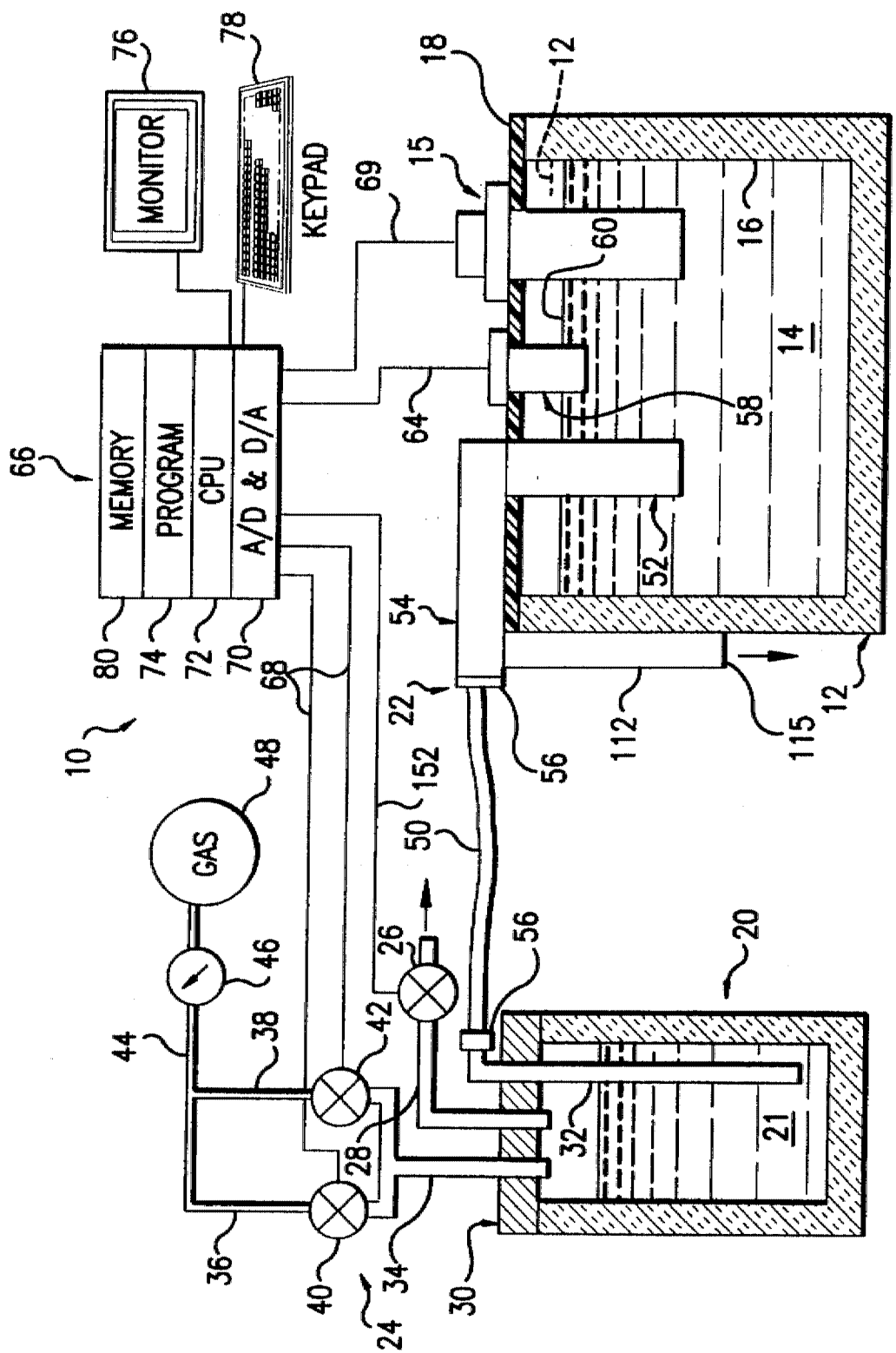
FIG. 1 is a schematic drawing partially in section of an apparatus according to the invention.

Apparatus of the invention controls the level of cold liquified gas where a constant level of liquid is to be maintained. As used herein, the term "liquified gas" means the low temperature liquified phase of a substance that is gaseous at atmospheric temperature and pressure, such as cryogenic liquid nitrogen, oxygen, hydrogen or helium. A preferred embodiment is a calorimeter incorporating liquified gas for low temperature cooling of samples, for example a Perkin-Elmer model DSC-7 differential scanning calorimeter ("DSC") for comparing thermal characteristics of a pair of samples. Although the invention is particularly advantageous with respect to a calorimeter, it will be appreciated that the invention should be useful for any container of cold liquified gas where the level is to be maintained. Despite insulation such liquid tends to evaporate due to some heat leakage from the ambient surroundings. Also, instrument components that are being cooled, for example in the calorimeter, may add to heat evaporation of the liquid. The present invention is directed to replenishing the intrinsic loss of liquid by heat evaporation and/or by a regular withdrawal of the liquid or its cold evaporant for a purpose such as surface cooling.

Basic components of the apparatus 10 include an insulated vessel 12 for liquid nitrogen 14 (or other liquified gas) for cooling instrument components 15. The vessel is formed of sidewalls 16 and a cover 18 substantially sealed thereto. A pressure tank 20 of liquid nitrogen supply 21 is used for filling the vessel and replenishing the liquid therein. A conduit assembly 22 connects from the tank to the vessel for transferring liquid from the tank to the vessel by means of pressure in the tank. Gas pressure to the tank is provided by a pressure means 24 with a pressure metering system of at least one pressure regulator and valving leading from a pressurized supply of gas. The pressure gas preferably has the same composition as the liquid. A pressure relief valve 26 in an exhaust line 28 leading from above liquid level also should be provided for relieving pressure in the tank.

The pressure means and its associated connections into the supply tank 20 are formed of conventional, non-cryogenic components. For example, a gas connection block 30 attaches to the top of the tank with quick disconnect flanges (not shown) held with a Marmon clamp or the like. The block has three pipes leading in. One pipe 32 leads from the conduit assembly 22 to near the bottom of the tank. Another is the exhaust line 28 from the top with the solenoid valve 26 therein. The third is a pressurization pipe 34 to the top of the tank. The latter pipe preferably has two legs 36, 38 each having a respective solenoid valve 40, 42, and each leg reconnects to a common pipe 44 to the main regulator 46 of the gas supply 48. One leg 38 provides higher pressure, e.g. about $0.56 \times 10^5$ Pascals (N/m$^2$) gage (8 psig), and the other leg 36 provides lower pressure, e.g. nominally $0.11 \times 10^5$ to $0.18 \times 10^5$ Pascals gage (1.5–2.5 psig). These are suitable pressures for a DSC; other levels may be selected for other Applications. The valves are on-off types that are capable of effecting the pressure pulsing described below, such as solenoid valves. A suitable larger valve is model B2017-S58 from Precision Dynamics inc., New Britain, Conn., and a suitable smaller valve is model ET-30M-24VDC from Clifford, Cincinnati, Ohio.

The pressures are determined by valve orifice size. The valve 42 in the higher pressure leg has a larger valve orifice to provide the greater pressure close to or nominally less (e.g. 20%) than the pressure from the regulator 46. The other valve 40 has a smaller valve orifice to provide a significant pressure drop to effect the lower pressure into the tank. Alternatively, a separate regulator for the lower pressure may be installed in the low pressure leg, or separate regulators in each leg, with both valves being large enough for minimal pressure drop. Also, although not normally needed, a pressure gage (not shown) may be connected to the tank.

The conduit assembly 22 is formed basically of three tandem sections. A transfer line 50 is connected to transfer the cryogenic liquid 21 from the tank. A vessel inlet section 52 is sealed into the cover 18 of the vessel and extends down into the liquid 14. A duct section 54 is connected between the transfer line 50 and the inlet section. The transfer line from the tank is a conventional cryogenic type such as flexible vacuum-insulated tubing. The connections 56 between sections preferably utilize quick connectors to allow easy disassembly and replacement of the supply tank, the type of connector not being important to the present invention. A suitable type of connector comprises a stainless steel tube that slides tightly into a tubing of polytetrafluoroethylene (PTFE) that is circumferentially compressed with a ferrule.

In the vessel 12, a sensor or an assembly 58 of sensors of the liquid level 60 in the vessel is mounted in the cover 18 to extend down past the selected operating liquid surface level 62. (The actual liquid level 60 generally is not exactly the same as the selected level 62.) Signals associated with the sensors are conveyed on signal lines 64 to a controller 66 which is preferably a computer and is operatively connected between the sensor assembly 58 and the pressure means 24 to send appropriate command signals on control lines 68 to the pressure means. The computer includes a processing device that may be dedicated to the present application or may be the same as that used for the associated instrument, e.g. via cable 69. The computer generally should have analog/digital (A/D) and digital/analog (D/A) converters 70 as required for input and output (with appropriate amplifier circuits), a processing unit 72 (CPU), and a system control program 74 which may be software or firmware. A monitor 76 or other display or printer, and a keyboard or keypad 78 may be utilized, particularly for the associated instrument. However, the present application should be substantially automated so that operator controls may be merely for starting and stopping the liquid filling and maintenance operation. Also, memory 80 (RAM and disk) may exist for the instrument and be used for the present case, but this function may readily be included in the program for the present application. Those of ordinary skill will be able to readily assemble a computer program with conditional and clock statements for applying the pressure sequences described herein.

Figure 2:
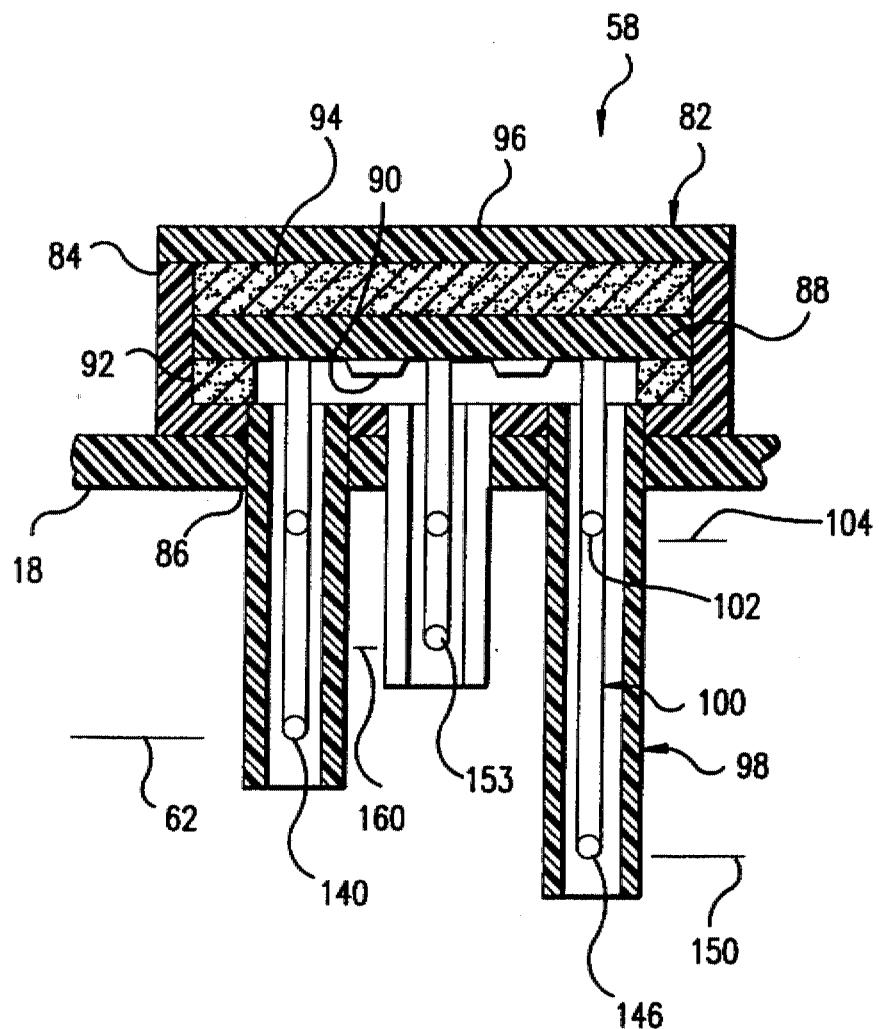
FIG. 2 is a vertical section of a sensor assembly of the apparatus of FIG. 1.

Although only one sensor may be used for simple control for constant fluid level, advantageously there is an assembly 58 of sensors, preferably three sensors 140, 146, 153 (FIG. 2). The assembly has a housing 82 including a base section 84 mounted on the vessel cover 18 over an aperture 86 therein. The base section conveniently is rectangular. A circuit board 88 of wiring connections 90 for the sensors is affixed in the base section between a gasket 92 in the bottom and a compression pad 94 on top held by a housing cover 96 screwed in place, the gasket and pad being, for example, soft silicone rubber. The pad seals the top portion of the housing, particularly the wire exit holes, and provides some degree of float for the circuit board.

Each sensor advantageously is an electronic temperature sensor such as a conventional cryogenic thermistor with leads also acting as support leads connected into the circuit board so that each sensor extends downward from the base section into the vessel to a respective selected level. The sensor determines only whether the liquid level is above or below the sensor. Actual temperature need not be measured.

The assembly housing 82 further includes three tubular extensions 98 extending from the housing base downward in the vessel, each extension enveloping an associated sensor and its support leads 100 so that some space exists around the sensor and its leads. Each extension may open into the housing base 84 with sealing being provided by the gasket and, for example, has an internal diameter and a bottom opening of about 6 mm. Each extension extends down to a point incrementally below its associated sensor, for example about 6 to 9 mm. Each extension has one or more (e.g. 2 opposing) vent holes 102 located above a nominally maximum liquid level 104, to allow the liquid to rise and fall easily around the sensor. (The terms "nominally maximum liquid level" and "nominally minimum liquid level" as used herein mean respectively the maximum and minimum levels of the liquid normally expected during ordinary operations except at low level before startup.)

Figure 3:
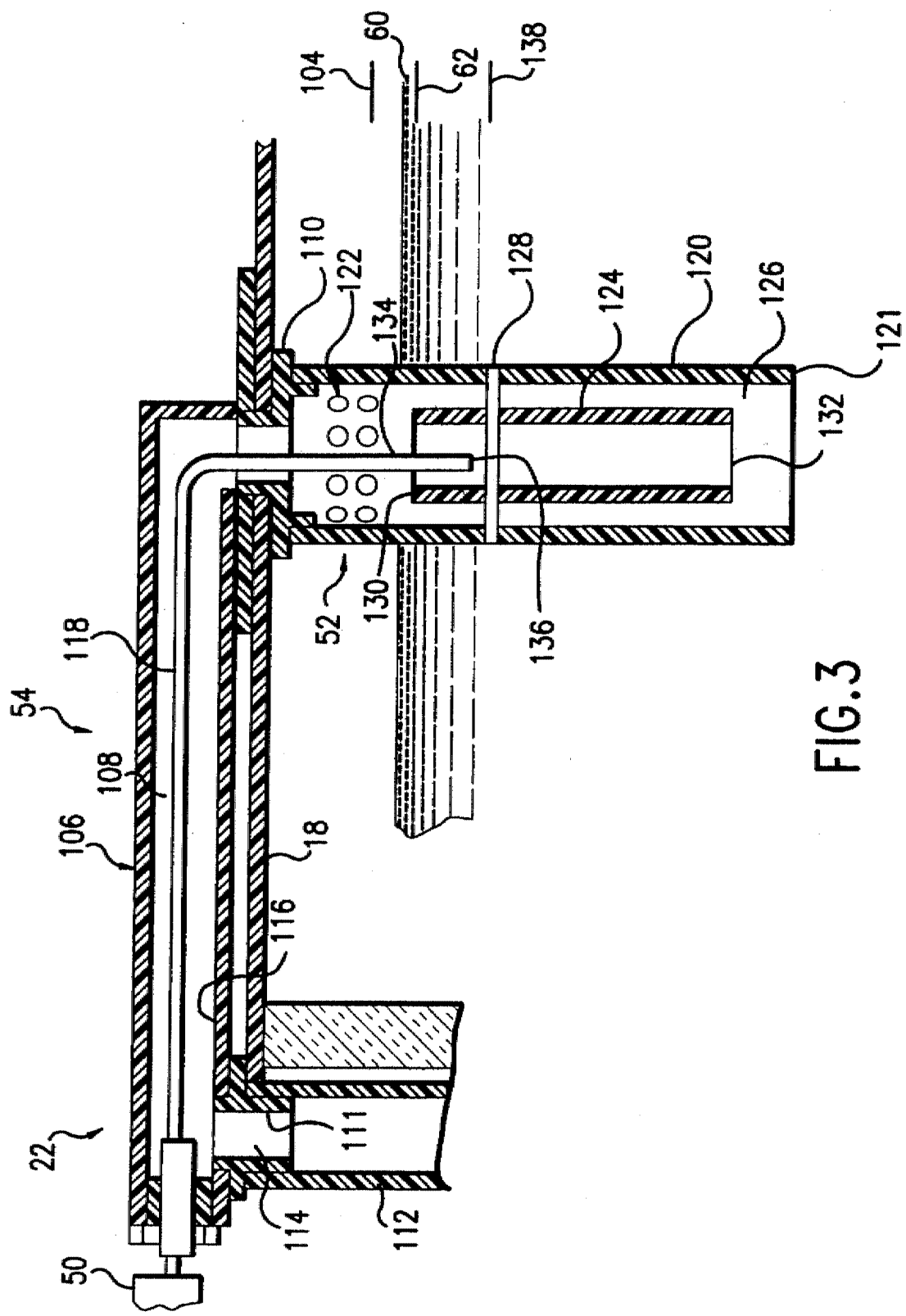
FIG. 3 is vertical section of liquid transfer components of the apparatus of FIG. 1.

The duct section 54 (FIG. 3) of the conduit assembly 22 is formed of a duct housing 106 with an exhaust channel 108 therein for exhausting vaporized liquid from the vessel. This housing may be of cylindrical or rectangular (or square) cross section and conveniently rests on the cover 18 to its edge. The exhaust channel extends between one flanged fitting 110 at the inlet section 52 and opposite fitting 111 into an external exhaust pipe 112. The exhaust pipe fitting connects to the channel 108 at an opening 114 in a sidewall 116 of the duct near the end proximate the transfer line 50, and has an opening 115 (FIG. 1) to atmosphere at a convenient distance from the duct. A liquid injection tube 118, for example flexible PTFE 1.6 mm inside diameter, extends from the transfer line through the duct into the vessel. Cold gas exhausting through the channel 108 from the vessel helps keep the cryogenic liquid in this line cold.

The inlet section 52 of the conduit assembly 22 has an outer baffle 120, preferably cylindrical, extending downward from the flanged fitting 110 in the cover port into the vessel to a point 121 substantially below the normal operating level 62 for the liquid. The outer baffle has at least one and preferably a plurality of circumferentially distributed exhaust vents 122 located above the nominally maximum liquid level 104 so as to exhaust gas from above the liquid level 60 into the duct housing.

An inner baffle 124 is mounted coaxially within the outer baffle so as to define an annular space 126 therebetween, e.g. about 2 to 4 mm wide. The inner baffle, is affixed to the outer baffle, e.g. with a transverse pin 128 press fitted through these components. The inner baffle has an upper end 130 located just below the exhaust vents 122, generally proximate the selected operating level 62 of the liquid. Its lower end 132 is nominally above the bottom 121 of the outer baffle. The injection end 134 of the injection tube 118 extends from a bend in the tube down partially into the inner baffle, the injection tube having an exit orifice 136 below the nominally minimum liquid operating level 138. This arrangement of the baffles and injection tube allows the liquid to be injected under pressure from the tank into the vessel with a minimum of physical and thermal turbulence. Escaping gas surrounding the inner and outer baffles is blocked from prematurely warming and vaporizing the arriving liquid from the injection tube. The inlet section 52 should be approximately centralized in the vessel to the extent practical with respect to instrument components. Effect of any remaining turbulence on level control is further minimized by locating the sensor assembly 58 spaced about equally between the inlet section 52, the instrument components 15 and a vessel wall 16 (FIG. 1).

Figure 4:
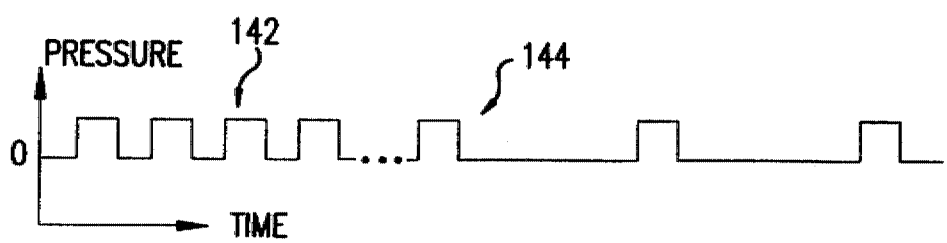
FIG. 4 is a graph of pressure pulses utilized in the apparatus of FIG. 1.

The sensor assembly (FIG. 2) includes at least a primary sensor 140 disposed to sense the liquid level being above or below the selected operating level 62. The controller is operatively connected between the primary sensor and the pressure means 24 for commanding the pressure means to effect control pressure to the tank. During maintenance of liquid level, the control pressure is applied as a series of pressure pulses applied to the supply tank by the first (smaller) valve 40 (FIG. 1) by opening and shutting this valve. A first series of pressure pulses 142 (FIG. 4) is effected with this valve when the liquid level 60 is sensed to be below the selected operating level 62. These pulses are provide at a control pressure pulse height and pulse period such that the pressure in the tank is augmented to maintain liquid input to the vessel in excess of the intrinsic loss until the liquid level reaches the operating level. The pulse height, pulse width and pulse period are selected for the particular vessel conditions. For the DSC, suitable pulse height, width and period were found to be $0.14 \times 10^5$ Pascals (2 psi), 4 seconds and 7 seconds respectively.

When the level 60 is sensed to reach the selected operating level 62, the first series of pulses 142 is terminated. Due to remnant pressure in the tank, there will be overshoot of supply to the vessel and continued increase in liquid level until the pressure subsides from the continuing flow out of the tank. In one aspect it is sufficient to merely pause in application of pressure until the intrinsic loss of liquid in the vessel lowers the level to the selected operating level which is again sensed to restart the pulses. This sequence is cycled to maintain the actual liquid level substantially at the operating level in compensation for the intrinsic declination.

As the intrinsic loss may be too rapid and cause excess undershoot of the level, advantageously the control pressure further comprises a second series of pressure pulses 144 effected with the first valve 40 when the liquid level is detected above the operating level. These pulses are applied from the same valve as the first series, but with less pulse time, e.g. with width and period 3 and 21 seconds respectively. These parameters are selected so that the pressure in the tank is decremented until the liquid level in the vessel reaches the selected operating level, preferably in about the same length of time as the first series is run. The first series then is restarted. Thus the first series 122 and the second series of pressure pulses 144 (FIG. 4) are applied alternately as pressure pulse cycling to maintain the liquid level substantially at the operating level. It will be appreciated that, although the pulses are conveniently on-off by the valve, application of the pressure pulses by sinusoidal means or the like by slow valving would also serve.

In a typical startup situation, the initial liquid level in vessel the is likely to be substantially below operating level, or the vessel may even be empty. Thus a selected startup sequence is desirable. For this a lower sensor 146 (FIG. 4) is disposed in the vessel at a lower level than the operating level (e.g. about 2 mm lower) for sensing the liquid level being above or below the lower level. The controller is further operatively connected between the lower sensor and the pressure means 24 for commanding the pressure means to further effect the control pressure in one of several startup pressure sequences (FIG. 5) prior to the pressure pulse cycling. A startup pressure sequence applies a constant initial pressure to the tank when the liquid level is below the lower level, so as to provide a transfer 148 of liquid to the vessel more rapidly during startup than with the pressure pulses. The constant pressure is terminated when the level reaches the lower sensor level 150. The controller also is operatively connected by a line 152 (FIG. 1) to the exhaust valve 26 on the tank 20 to open this valve upon pressure termination to quickly relieve the higher pressure and reduce overshoot.

The initial pressure may be applied from the same valve 40 as for the pressure pulses and thus be equal to the pulse height. In such case the other valve 42 will not be needed. However the initial fill may be too slow. Thus it is preferable for the initial pressure to be greater than the control pressure pulse height, by use of the second (larger) valve 42 to effect the higher pressure.

Due to the higher initial pressure at startup, significant overshoot above the operating level may occur. To reduce this, an upper sensor 153 is disposed in the vessel at a higher level 160 than the operating level (e.g. 5 mm higher) for sensing the liquid level being above the higher level. The controller is further operatively connected between the upper sensor and the pressure means 24 for commanding the pressure means to further effect the control pressure, particularly in the startup sequence. The startup pressure sequence then further comprises termination of application of any pressure to the tank (when the level hits the lower sensor) for a time delay $T_1$ commencing (during application of the initial pressure) when the liquid level reaches the lower sensor. The time delay is selected such that the liquid level reaches a preliminary level (which is not any exact level) proximate the operating level 62. The delay may be terminated by further sensing, but it is sufficient to select a time delay approximately by experimentation. A suitable delay of 75 seconds was determined for the present case. The exhaust valve 26 is closed at the end of the time delay. After this delay, the startup pressure sequence initiates the pressure pulse cycling.

Figure 5A:
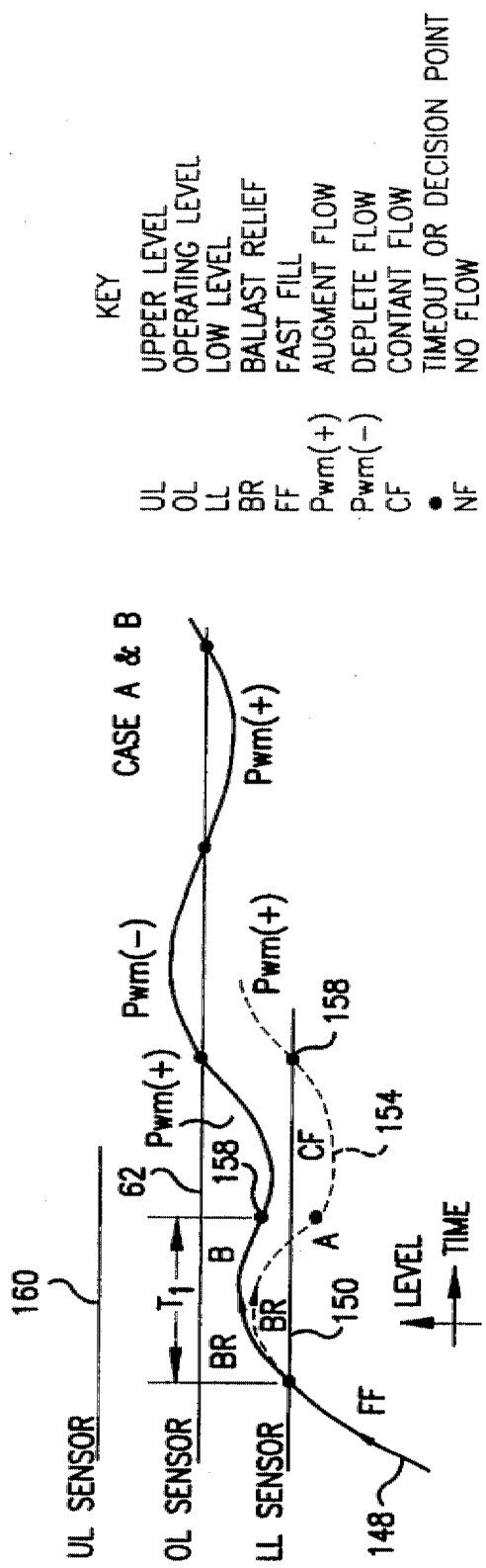
FIG. 5(A–C) is series of graphical curves illustrating liquid level in the apparatus of FIG. 1 with different startup conditions.
Figure 5B:
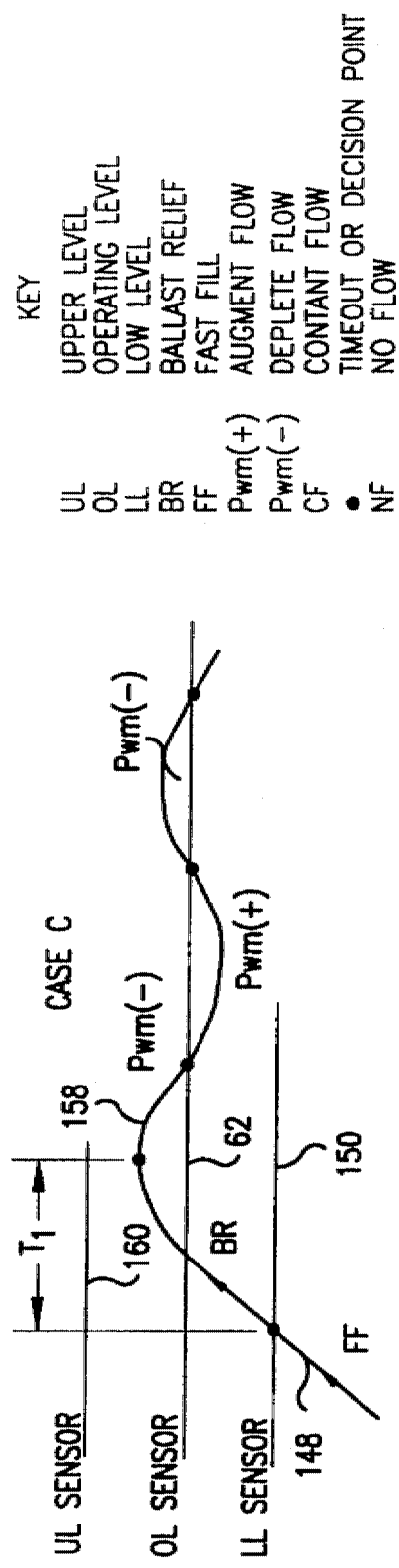
Figure 5C:
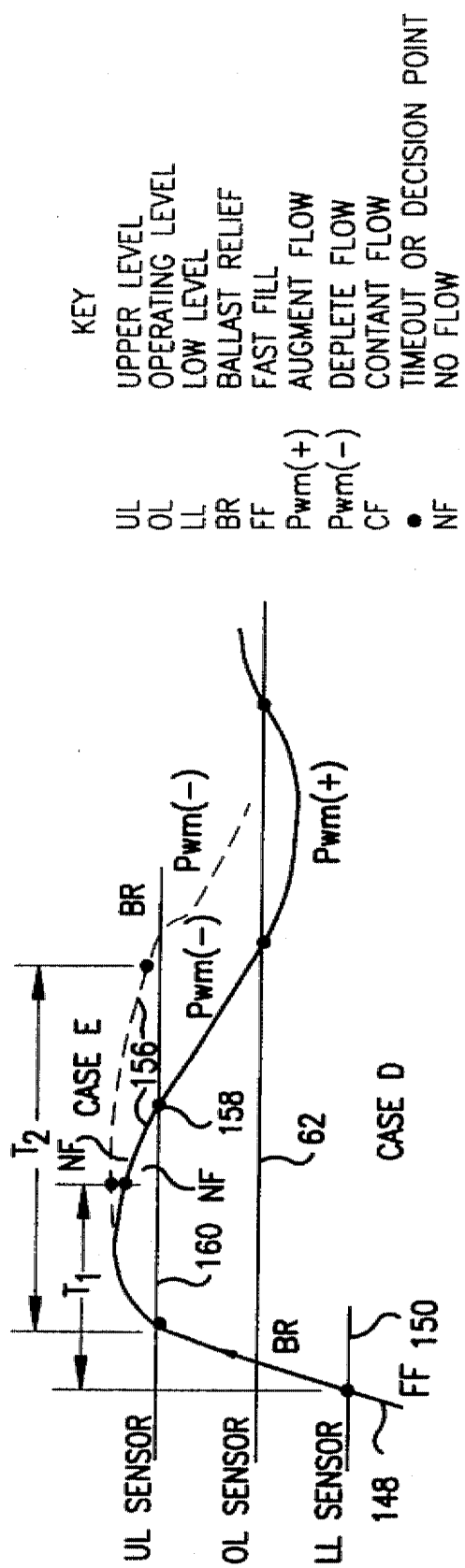

The normal cycling may be initiated immediately after the foregoing, but further overshoot may be reduced by application of an intermediate stage of pressure after the time delay and before entering the normal cycling (FIG. 5). A first intermediate stage 154 (Case A) is utilized if the preliminary level is below the lower level, or a second intermediate stage 156 is utilized if the preliminary level is above the upper level (Cases D and E). There is immediate initiation 158 of the pressure pulse cycling if the preliminary level is already between the lower level and the upper level (Cases B and C).

The first intermediate stage comprises a constant higher pressure from the larger valve 42 applied to the tank until the liquid level reaches the lower level. At this point the regular pulse cycling is started 158 using the smaller valve 40.

The second intermediate stage comprises both valves being closed with ever-decreasing pressure in the tank until the liquid level reaches the upper level by the intrinsic declination. At this point the regular pulse cycling is started 158 using the smaller valve 40.

A further feature is desirable in case of excess or delayed overfill with the second intermediate stage (Case E). The controller is operatively connected to open the relief valve 26 if the liquid level remains above the upper sensor level 160 upon conclusion of an additional preset time period $T_2$ (e.g. 30 seconds) beginning with the liquid level reaching the upper level. Thereafter the controller closes the relief valve when the liquid level thereafter reaches the upper level by the intrinsic declination. The regular pulse cycling is then started.

Accurate maintenance of the liquid at operating level is further improved with effective insulation of the vessel and associated components. Thus the vessel sidewalls 16 (FIG. 1) should be thermally insulated, and the cover 18 formed substantially of thermal insulating material. The insulation may be effected with conventional or other desired means such as foam blocks and/or insulating dead gas spaces (e.g. 3 such spaces) separated by polymer sheets. The assembly housing 82 (FIG. 2) should also be formed substantially of thermally insulating material, advantageously an insulating polymer such as General Electric Ultem™ plastic. Outer walls, and preferably also inner wall layers, should be silverized such as with aluminum paint, tape or foil to minimize entry of radiant heat.

It was found that the liquid level could be maintained at the operating level within about 0.5 mm with a system as described above. Startup time is about 30 minutes for an initially empty vessel of 1.2 l. The system automatically fills the vessel at the beginning and, with good insulation, can maintain the level for approximately 24 hours from an ordinary supply tank of 50 l.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An apparatus for controlling level of cryogenic liquid, comprising a vessel for containing a cryogenic liquid having a liquid level in the vessel subject to an intrinsic declination, a pressure tank for holding a supply of the cryogenic liquid, a transfer duct connected to transfer liquid from the tank to the vessel by pressure in the tank, pressure means for selectively effecting pressure in the tank so as to effect the transfer, a primary sensor disposed to sense the liquid level being above or below a selected operating level, and a controller operatively connected between the primary sensor and the pressure means for commanding the pressure means to effect control pressure to the tank, the control pressure comprising a first series of pressure pulses effected when the liquid level is below the operating level such that the pressure in the tank is augmented until the liquid level reaches the operating level, whereby the liquid level is maintained substantially at the operating level in compensation for the intrinsic declination.

2. The apparatus of claim 1 wherein the control pressure further comprises a second series of pressure pulses effected when the liquid level is above the operating level such that the pressure in the tank is decremented until the liquid level reaches the operating level, the first series and the second series of pressure pulses being applied alternately as pressure pulse cycling.

3. The apparatus of claim 2 further comprising a lower sensor disposed in the vessel a lower level than the operating level for sensing the liquid level being above or below the lower level, the controller being further operatively connected between the lower sensor and the pressure means for commanding the pressure means to effect the control pressure, the control pressure further comprising a startup sequence prior to the pressure pulse cycling, the startup sequence comprising a constant initial pressure to the tank when the liquid level is below the lower level, so as to transfer liquid to the vessel more rapidly during startup than with the pressure pulses.

4. The apparatus of claim 3 wherein the pressure pulses have a control pressure pulse height, and the initial pressure is substantially equal to the control pressure pulse height.

5. The apparatus of claim 3 wherein the pressure pulses have a control pressure pulse height, and the initial pressure is greater than the control pressure pulse height.

6. The apparatus of claim 5 wherein the pressure means comprises a pressure regulator receptive of pressurized gas, a first on-off valve connected between the regulator and the tank for selectively effecting the initial pressure, and a second on-off valve connected between the regulator and the tank, the second valve having a pressure drop constriction therein to effect the control pressure pulse height.

7. The apparatus of claim 5 further comprising an upper sensor disposed in the vessel at a higher level than the operating level for sensing the liquid level being above the highest level, and a normally closed pressure relief valve disposed in the tank above the liquid therein, the controller being further operatively connected between the upper sensor and the pressure means for commanding the pressure means to effect the control pressure, and operatively connected to selectively open the relief valve in the startup sequence, the startup sequence further comprising termination of application of control pressure and simultaneously opening of the relief valve for a time delay commencing during application of the initial pressure when the initial pressure the liquid level reaches the lower level, the time delay being selected such that the liquid level normally reaches a preliminary level proximate the operating level, and the startup sequence further comprises initiating the pressure pulse cycling after the time delay.

8. The apparatus of claim 7 wherein after the time delay and prior to the pressure pulse cycling the startup sequence further comprises a first intermediate stage if the preliminary level is below the lower level, or a second intermediate stage if the preliminary level is above the upper level, or immediate initiation of the pressure pulse cycling if the preliminary level is between the lower level and the upper level, the first intermediate stage comprising a constant pressure less than the initial pressure applied to the tank until the liquid level reaches the lower level, and the second intermediate stage comprising terminating application of pressure to the tank until the liquid level reaches the upper level by the intrinsic declination.

9. The apparatus of claim 8 whereby, with respect to the second intermediate stage, the controller is operatively connected to open the relief valve if the liquid level is above the upper level upon conclusion of a preset time period beginning with the liquid level reaching the upper level, and to close the relief valve when the liquid level thereafter reaches the upper level by the intrinsic declination.

10. The apparatus of claim 7 wherein the apparatus further comprises a sensor assembly mounted into the vessel, the assembly comprising each sensor, a housing including a base section, and a circuit board affixed in the base section, each sensor comprising an electronic temperature sensor with support leads connected into the circuit board so that the sensor extends downward from the base section into the vessel to its respective level, the housing further including a tubular extension for each sensor extending downward in the vessel, each extension openly enveloping its sensor and support leads and extending to a point incrementally below its sensor, and the extension having a bottom opening and having a vent hole above a nominally maximum liquid level, whereby the liquid level can extend into each tubular extension with minimal physical and thermal turbulence.

11. The apparatus of claim 10 wherein the vessel further comprises a cover and the base section of the sensor assembly is mounted to the cover.

12. The apparatus of claim 1 wherein the apparatus further comprises a sensor assembly mounted into the vessel, the assembly comprising the sensor, a housing including a base section, and a circuit board affixed win the base section, each sensor comprising an electronic temperature sensor with support leads connected into the circuit board so that each sensor extends downward from the base section into the vessel to its respective level, the housing further including three tubular extensions extending downward in the vessel, each extension openly enveloping an associated sensor and its support leads and extending to a point incrementally below its associated sensor, and each extension having a bottom opening and having a vent hole above a nominally maximum liquid level, whereby the liquid level can extend into each tubular extension with minimal of physical and thermal turbulence.

13. The apparatus of claim 12 wherein the vessel further comprises a cover and the base section of the sensor assembly is mounted to the cover.

14. The apparatus of claim 1 wherein the vessel comprises a sealed cover, the transfer duct comprises a transfer line connected to transfer liquid from the tank, a vessel inlet section sealed into the cover, and a duct section connected between the transfer line and the inlet section;

the duct section comprising a duct housing with an exhaust channel therein, and a liquid injection tube extending therethrough, the injection tube being connected to pass liquid from the transfer line, the housing duct having an exhaust port proximate the transfer line and oppositely an opening into the inlet section; and the inlet section comprising a cylindrical outer baffle extending downward from the ducting section into the vessel substantially below the operating level, a cylindrical inner baffle mounted coaxially within the outer baffle so as to define an annular space therebetween, and an injection end of the injection tube extending partially into the inner baffle, the injection tube having an exit end below a nominally minimum operating level, the outer baffle having one or more exhaust vents located in the vessel above a nominally maximum liquid level so as to exhaust gas from above the liquid level in the vessel through the duct housing to the exhaust port, and the inner baffle having an upper end located below the exhaust vents and a lower end located above that of the outer baffle, whereby liquid under pressure from the tank is injected into the vessel with a minimum of physical and thermal turbulence.

15. The apparatus of claim 14 wherein the vessel comprises sidewalls sealed to the cover, the inlet section and the duct section are connected at a port in the deck, and the apparatus further comprises a sensor assembly mounted to the deck spaced between the inlet section and a sidewall, the assembly comprising each sensor extending downward from the base section into the vessel to its respective level.

16. The apparatus of claim 15 wherein the sensor assembly further comprises a housing including a base section, and a circuit board affixed in the base section, each sensor comprising an electronic temperature sensor with support leads connected into the circuit board so that each sensor extends downward from the base section into the vessel to its respective level, the housing further including three tubular extensions extending downward in the vessel, each extension openly enveloping an associated sensor and its support leads and extending to a point incrementally below its associated sensor, and each extension having a vent hole above the liquid level, whereby the liquid level can extend into each tubular extension with a minimum of physical and thermal turbulence.

17. The apparatus of claim 16 wherein the vessel sidewalls are thermally insulated, and the cover and the housing are formed substantially of thermally insulating material.

18. An apparatus for transferring cryogenic liquid, comprising a vessel for containing a cryogenic liquid, a pressure tank for holding a supply of the cryogenic liquid and having a sealed cover, and a transfer duct connected to transfer liquid from the tank to the vessel by pressure in the tank;

the transfer duct comprising a transfer line connected to transfer liquid from the tank, a vessel inlet section sealed into the cover, and a duct section connected between the transfer line and the inlet section;

the duct section comprising a duct housing with an exhaust channel therein, and a liquid injection tube extending therethrough, the injection tube being connected to pass liquid from the transfer line, the housing duct having an exhaust port proximate the transfer line and, oppositely the exhaust port, an opening into the inlet section; and the inlet section comprising a cylindrical outer baffle extending downward from the ducting section into the vessel substantially below the operating level, a cylindrical inner baffle mounted coaxially within the outer baffle so as to define an annular space therebetween, and an injection end of the injection tube extending partially into the inner baffle, the injection tube having an exit end below a nominally minimum operating level, the outer baffle having one or more exhaust vents located in the vessel above a nominally maximum liquid level so as to exhaust gas from above the liquid level in the vessel through the duct housing to the exhaust port, and the inner baffle having an upper end located below the exhaust vents and a lower end located above that of the outer baffle, whereby liquid under pressure from the tank is injected under pressure from the tank into the vessel with a minimum of physical and thermal turbulence.

* * * * *